United States Patent [19]
Johansson et al.

[11] Patent Number: 5,526,923
[45] Date of Patent: Jun. 18, 1996

[54] DRIVE UNIT FOR LOADING EQUIPMENT IN AN AIRPLANE

[75] Inventors: Torbjorn Johansson, Oberdolling; Josef Neumeier, Kinding, both of Germany

[73] Assignee: Elektro-Metall Export GmbH, Ingolstadt, Germany

[21] Appl. No.: 328,723

[22] Filed: Oct. 25, 1994

[30] Foreign Application Priority Data

Oct. 29, 1993 [DE] Germany .................. 43 36 978.2

[51] Int. Cl.⁶ ................................................. B65G 35/00
[52] U.S. Cl. .................... 198/722; 198/782; 198/791; 244/137.1
[58] Field of Search ........................... 198/722, 782, 198/791; 414/529, 535; 244/137.1

[56] References Cited

U.S. PATENT DOCUMENTS

| | | | |
|---|---|---|---|
| 3,698,539 | 10/1972 | McKee | 198/782 |
| 4,949,837 | 8/1990 | Huber | 198/782 |
| 5,020,657 | 6/1991 | Huber | 198/782 |
| 5,131,527 | 7/1992 | Huber | 198/782 |
| 5,186,417 | 2/1993 | Pritchard | 244/137.1 |

FOREIGN PATENT DOCUMENTS

| | | |
|---|---|---|
| 3911214C2 | 1/1991 | Germany . |
| 3942381C1 | 1/1991 | Germany . |
| 4134534C1 | 7/1992 | Germany . |
| 4224818A1 | 2/1994 | Germany . |

*Primary Examiner*—Joseph E. Valenza
*Attorney, Agent, or Firm*—Cort Flint

[57] ABSTRACT

The invention relates to a drive unit, in particular for loading equipment in an airplane, with a drive element (8) contained in a housing (7). According to the invention the drive unit is connected to the housing (7) by linear guides (25, 26) which are guides for vertical movement. The transmission includes a planetary gear in which the planet gear carrier is made in the form of a swivelling planet wheel rocker (16). Supporting elements (23, 24) are provided on the planet wheel rocker (16) and these engage respective stops (34, 35). The supporting elements provide an opposing moment on the planet wheel rocker (16) as a reaction to a braking moment exerted on a conveying wheel (9). This causes an upward contact pressure (arrow 43) to be exerted on the drive element (8) and thereby on the conveying wheel (9). In this manner, the contact pressure (arrow 43) is optimally adjusted to a load placed on the conveying wheel, so that wear and maintenance are reduced and overloading of the equipment is avoided (FIG. 4).

20 Claims, 4 Drawing Sheets

5,526,923

DRIVE UNIT FOR LOADING EQUIPMENT IN AN AIRPLANE

BACKGROUND OF THE INVENTION

The present instant invention relates to a drive unit and, in particular, to a drive unit for loading equipment into an airplane.

Equipping airplanes with automatic or semi-automatic loading equipment to load and unload containers or pallets (Unit Load Device "ULD") is known. For this purpose conveyor rollers in U-rails are normally installed on the floor of the loading deck for conveying of the material to be loaded in a straight line into the interior cargo space of the airplane. Instead of conveyor rollers, it is also possible to provide ball mats with rotatable balls near the loading opening, making it possible to convey in several directions. For this purpose, guiding elements are installed in addition.

For automatic or semi-automatic conveying, power drive units (PDUs) are also used. These drive units are normally located between the U-rails with the conveyor rollers or near the ball mats and consist essentially of a conveying wheel, a transmission, and a drive motor. The drive motor can be actuated manually by a loading foreman by a control stick or fully automatically by sensors.

In the loading or unloading process the containers or pallets are supported on the floor of the loading deck by the conveyor roller system. For continued controlled movement, a conveying wheel engages the container or pallet load from below with a friction coating against the bottom of the load. The conveying wheel and load are conveyed in the direction corresponding to the actuation and the direction of rotation of the drive motor. For continued movement in different directions, in particular for a deflection by 90° in the area of the ball mats, drive units are known having housings which can be rotated by a controllable rotating mechanism in the floor of the loading deck. Furthermore, such a loading device comprises additional components, in particular, to secure the position of the loaded material.

The present invention relates to a drive unit which is suitable in particular for utilization in the above-described loading device. A known PDU drive unit of this type consists of a housing and a drive unit which is contained in the housing. The drive unit comprises a conveying wheel, a transmission and an electric, controllable drive motor. The conveying wheel protrudes from the housing with part of its circumferential surface. The housing must be installed on the floor of the loading deck in such manner that the upper part of the circumferential surface of the conveying wheel is located in the area of the loading plane defined by the conveyor rollers or ball mats.

The conveying wheel is constituted in this case by a rim with an inflatable rubber tire similar to a known vehicle wheel. The height of the rotational axis of the wheel is fixed. The tire pressure provides a contact pressure between the bottom of the load and the conveying wheel. When the load is very light, this obviously entails a risk that the load may be lifted by the tire pressure from the conveyor rollers or the ball mat, since the air tire is not sufficiently compressed. If this risk is to be excluded by reducing air pressure, there is the other danger, that the contact pressure supplied by the inflated tire no longer suffices. In the case of heavy loads, adhesive friction between the conveying wheel and the bottom load is not sufficient. The conveying wheel slips against the load without moving it forward. The adjustment of the air pressure requires extensive operator action. Since the friction between the conveying wheel and load must be adjusted generally without adjustment to the applicable weight conditions, the rubber surfaces of the conveyor wheel are subject to excess wear.

A drive unit of this type (German DE 39 11 214 C2), especially suitable for a loading device in an airplane, includes a conveying wheel, a transmission, and a drive motor, disposed within a housing. The transmission contains a planetary gear with a rotation-driven toothed sun gear, and at least one toothed wheel engaging the sun gear and serving as the planet gear. The planet gear is connected to the conveying wheel for a drive. It is also known to mount the planet gear on a swivelling planet gear carrier. Support elements are provided which interact with an associated stop in such manner that the conveying wheel is forced upward with a force that is proportional to the braking moment acting upon the conveying wheel.

Similar drive units operating on the same basic principle are furthermore known from German documents DE 39 42 381 C2, DE 42 24 818 A1 and DE 41 34 534 C1. In this case the planetary gear is designed so that the planet gear carrier is a swivelling holding device. Only one planet gear is rotatably mounted on the latter as an intermediate toothed wheel between the sun gear, which serves as the drive shaft and the inner toothing of the conveying wheel. The drive shaft as well as the drive motor is fixedly installed across the housing. The axial arrangement is eccentric. The axes of rotation of the drive shaft of the conveying wheel and of the intermediate toothed wheel, although parallel, are offset in relation to each other. The swivelling holding device is mounted around the fixed drive shaft. When the drive motor is switched on, the swivelling holding device is swivelled by a slip clutch serving as a braking arrangement. The swivelling holding device is moved upward by the eccentric arrangement of the intermediate toothed wheel and the conveying wheel. As the conveying wheel is applied against the lower surface of a load, the coupling slides through and the conveying wheel is rotated.

In this arrangement the force which brings the conveying wheel upward into contact with the conveyed load is relatively strong. The force depends in a non-linear manner on the existing swivelling angle of the swivelling holding device, since the angle from the vertical must be kept relatively small and since a kind of elbow lever arrangement is provided. With heavy load objects, the weight swivelling back causes this angle to be enlarged, causing the contact pressure to be reduced. This effect unfavorably counteracts the other effect, which causes the contact pressure to increase when the braking moment exerted on the conveying wheel increases. Furthermore, it is a considerable disadvantage that the load weight bears directly on the drive shaft by the conveying wheel and the intermediate wheel. This causes the latter to be subjected to rotational as well as bending loads with the danger of damage in case of heavy loads.

Accordingly, an object of the present invention is to provide an improved drive unit of the type described above having a more favorable application of forces.

SUMMARY OF THE INVENTION

The objective, and others, is achieved by providing a drive unit which is movably connected to a housing by linear vertical guides perpendicular to the wheel axle of the driving wheel. The linear guides include a fixed guide element connected to the housing and a movable guide element connected to the drive unit. The linear guides are used on the one hand for relative movement in the vertical direction in order to adjust the height of the conveying wheel, and on the other hand to receive and support forces acting horizontally on the drive unit.

A transmission contains a planetary gear with a rotated toothed sun gear, and at least one toothed planet gear which engages the sun gear. The planet gear is connected to the conveying wheel for a drive. The planet gear is rotatably mounted on a planet gear carrier. In order to reduce the rpm's of the drive motor, the planetary gear can be made in several steps or may be preceded by an additional gear.

The planet gear carrier in the form of a planet gear rocker is carried coaxially about a swivel axis with the sun gear in a centered arrangement. At least one supporting element which swivels together with the planet gear rocker is provided on said planet gear rocker. The support element is disposed in a horizontal area around the swivel axis in relation to a centered position of the planet gear rocker, and at a lateral distance from the swivel axis. The movement of the supporting element follows the form of an arc of a circle positioned in a horizontal area around the swivel axis. When the rocker excursions are short, the movement is vertical and in the direction of the linear guide.

In the area and in the direction of this arc of a circle, a stop, associated with the supporting element, is fixedly mounted on the housing. As the sun gear is driven and a braking moment is applied to the conveying wheel by imposition of a container load, the supporting element bears on the stop with a counter-force determined by the geometric dimensions. This causes a corresponding, opposing shifting force to be exerted upon the movable part of the linear guide connected to the drive unit. The drive unit, and in particular the conveying wheel, is forced vertically upward with a force that is proportional to the braking moment exerted upon the conveying wheel.

The weight of the object load conveyed is supported advantageously in this case on the planet gear carrier by the planet gear axis which may be short and does not transmit any torque. Because of the centered arrangement, the possibility also exists of mounting the conveying wheel on the planet gear carrier in such a manner that the planet gear axles are also relieved of load. The planet gear carrier is supported by the supporting elements directly on the supporting element stops in case of load. The drive shaft is thereby relieved of weight loads overall.

A compact, structurally advantageous arrangement is provided wherein the conveying wheel is made in the form of a hollow wheel with an inner toothing, and the planetary gear is installed in the hub area of the hollow wheel. Preferably, three planet gears are arranged in an equilateral triangle within the planet gear carrier for good force transmission.

In order to ensure strong force transmission with relatively weak contact pressure, a circumferential surface of the conveying wheel is designed as the cylindrical surface of a friction coating. The friction coating may consist of a rubber layer.

A smooth linear guidance with strong horizontal force transmission is achieved by using four linear guide elements disposed in the housing in a rectangular arrangement. The linear guide may be provided by fixed guide rods on which sled guides, equipped with guide sleeves are slidably carried. The drive unit is mounted to the sled guides.

One supporting element and one stop may be sufficient for accommodating the contact pressure of the conveying wheel when the load is conveyed in only one direction. In order to maintain this effect for right and left rotation of the conveying wheel as well, it is necessary to provide one supporting element on either side of the sun gear axis, preferably at the same distance from the sun gear, and appertaining stops on the housing. This makes it possible to adapt the wheel for both conveying directions, for loading and unloading.

The supporting elements may be in the form of cylindrical rods, parallel to the sun gear axle, which are easy to produce and inexpensive to install. Due to the movement of the supporting element in short arc sections, their cylindrical configuration is suitable for form-fitting contact against the stops. The stop or stops can be displaced vertically in the same direction as the linear guide between an upper and a lower position. The stop or stops are pushed into the upper position by a spring associated with each. The springs bring the drive unit, or the conveying wheel, into an upper, non-loaded rest position or, in case of a load bottom being in place above it, is pushed into contact in function of the force of the spring. In the latter case, with a motor brake built into the drive motor, the conveying wheel becomes a braking device which prevents the load from moving by itself in a wrong direction. This is advantageous, for instance, when a plane stands on a sloped surface during loading or unloading. Furthermore, when the load bottom comes to lie on the conveying wheel, the rocker excursion and thereby the adaptation of the contact pressure are initialized. The spring used must be sized so that it can be overcome by the opposing force generated on the planet gear rocker.

In keeping with a safety consideration, the conveying wheel is lowered below the load plane or load bottom without actuation, so that no pressure contact exists between the conveying wheel and the load bottom. This ensures that loading and unloading can be carried out manually by the conveyor roller system and the ball mats without interference by the conveying wheels in case of a power failure. For such a design, the invention proposes that the conveying wheel of each drive unit be lowered in its non-actuated rest position, so that the supporting elements are resting against fixed, associated stops. In addition a braking device, preferably a brake disk whose braking action can be overcome by the braking moment exerted on the conveying wheel, is provided on at least one planet gear. In this way the planet gear rocker is moved in its excursion to such an extent that the entire drive unit moves upward and is available for the conveying process and for the accommodation the contact pressure when the drive motor is actuated as a result of the braking of a planet gear. Such a braking device, the effect of which is only needed at the beginning of actuation, could be continuously active, or only for the first rocker excursion.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
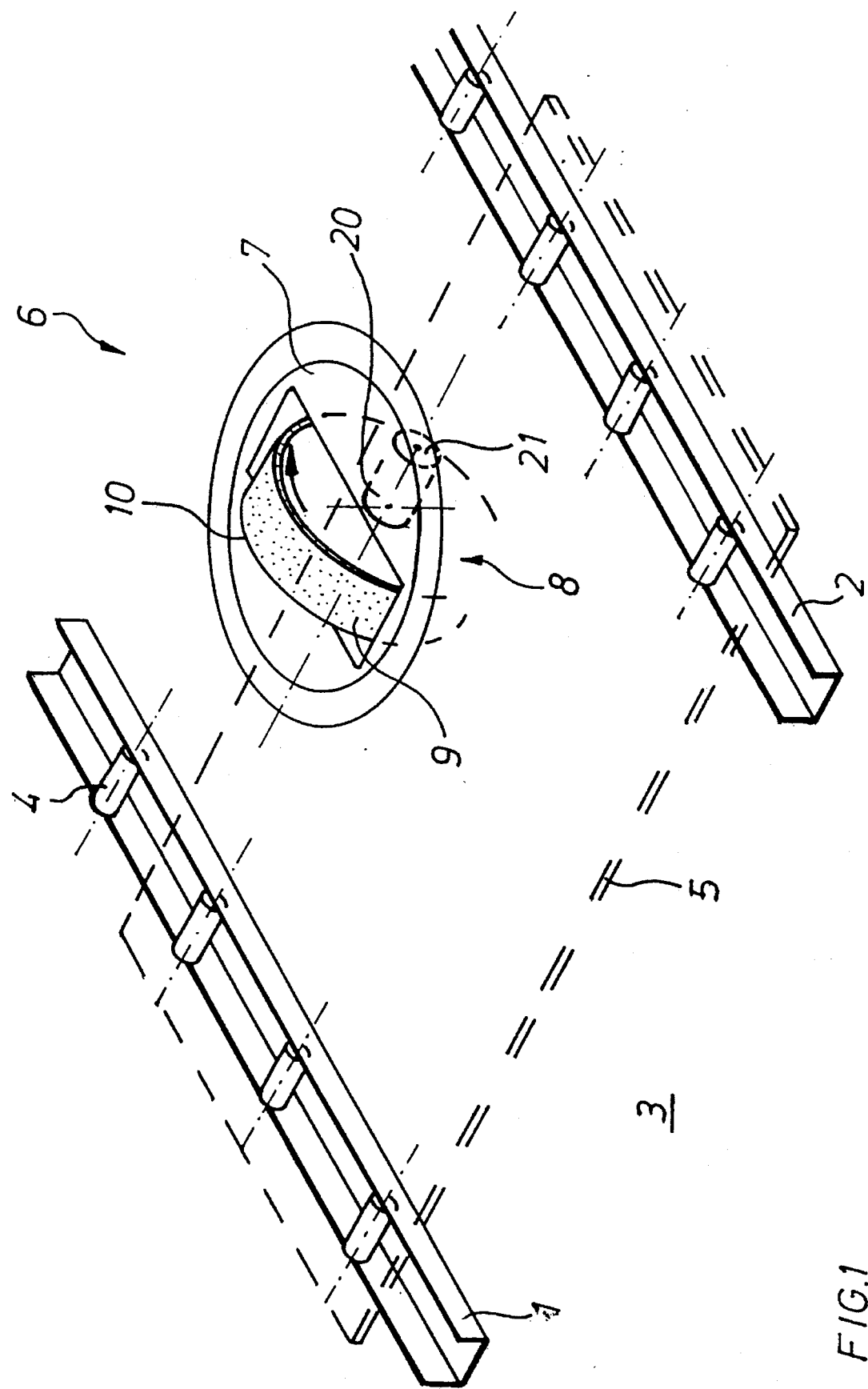
FIG. 1 schematically shows a view in perspective of part of a loading arrangement on the floor of a loading deck.

Referring now in more detail to the drawings, FIG. 1 shows U-rails 1, 2 spaced a distance from each other and attached to the floor 3 of a loading deck of an airplane. Rotatable conveying rollers 4 protruding above the U-rails 1, 2 are held in the U-rails. A bottom 5 of pallets or containers is drawn in broken lines is placed on the conveying rollers 4. The weight of the load on the floor is thus supported by the conveying rollers 4 and the U-rails 1, 2.

A drive unit 6 includes of a housing 7 and a drive element 8 contained in the housing is installed between the U-rails 1, 2. Drive element 8 comprises a conveying wheel 9 having a circumferential surface which protrudes from housing 7 into the loading plane defined by the conveying rollers 4. Drive element 8 is driven by a transmission 20 and an electric drive motor 21. The circumferential surface of the conveying wheel 9, is provided with a rubber coating 10 which serves as a friction coating.

As it is conveyed, the load 5 moves on top of the conveying wheel 9 which presses against the load from below and pushes the load bottom 5 on to the next drive unit 6 (not shown) by rotation. As many drive units may be provided as are necessary for the application being made.

Figure 2:
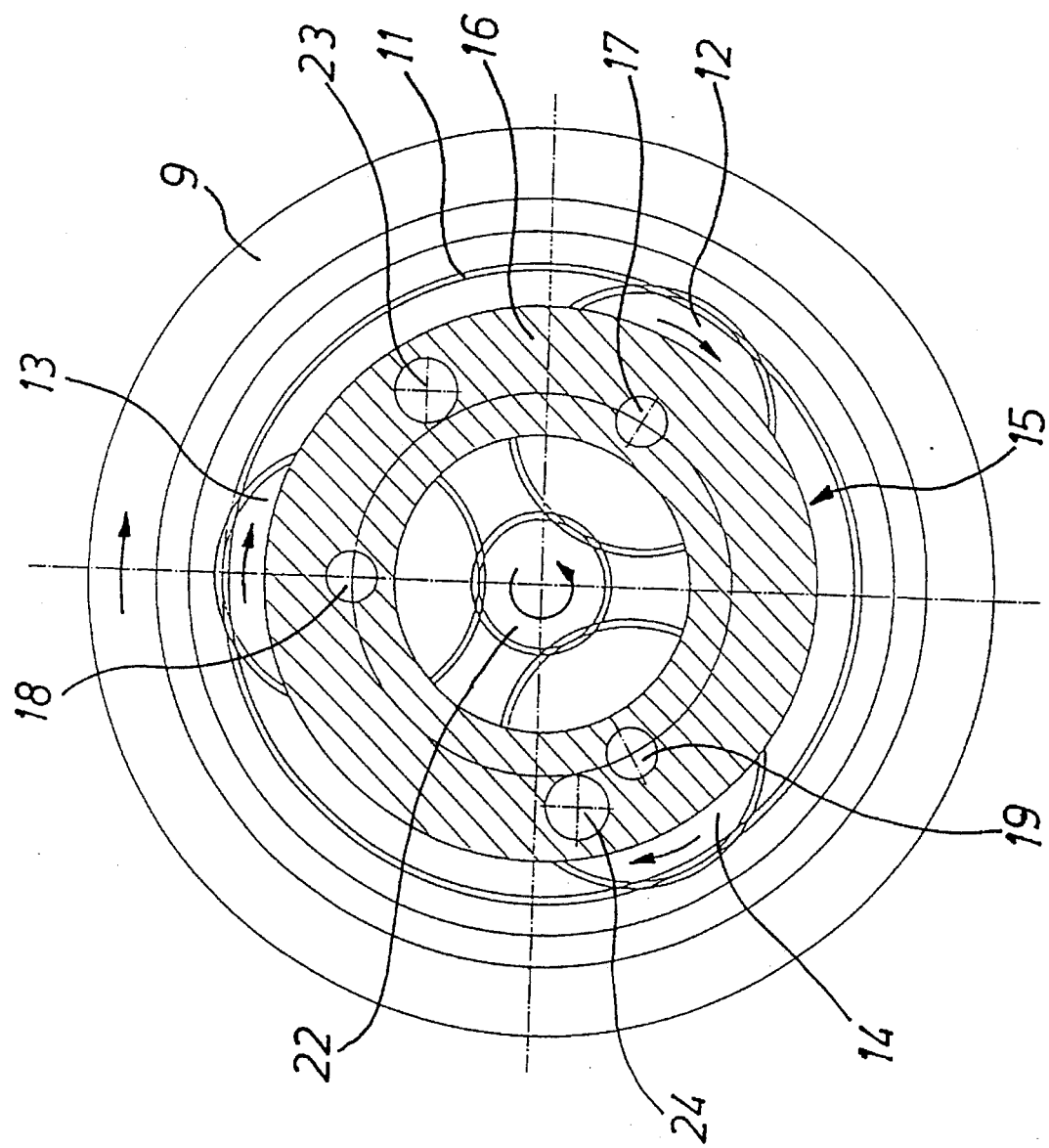
FIG. 2 shows a section through a drive unit in the area of a planet gear.

In the sectional view of FIG. 2, the conveying wheel 9 is shown as a hollow wheel with inner gear teeth 11 which engage with outer teeth of three planet gears 12, 13, 14. The planet gears 12, 13, 14 are mounted on a planet gear carrier in form of a ring wheel functioning as a planet gear rocker 16. The planet gear axles 17, 18, 19, are offset by 120° from each other. A central sun gear 22 driven by the drive motor 21 having teeth which mesh with the planet gears 12, 13, 14.

Two cylindrical supporting rods 23, 24, which are parallel to the sun gear axis, extend from the planet gear rocker 16, and their arrangement is described in further detail in connection with FIGS. 3 and 4. In FIG. 2 the supporting elements are drawn in the rotated position of FIG. 4.

Figure 3:
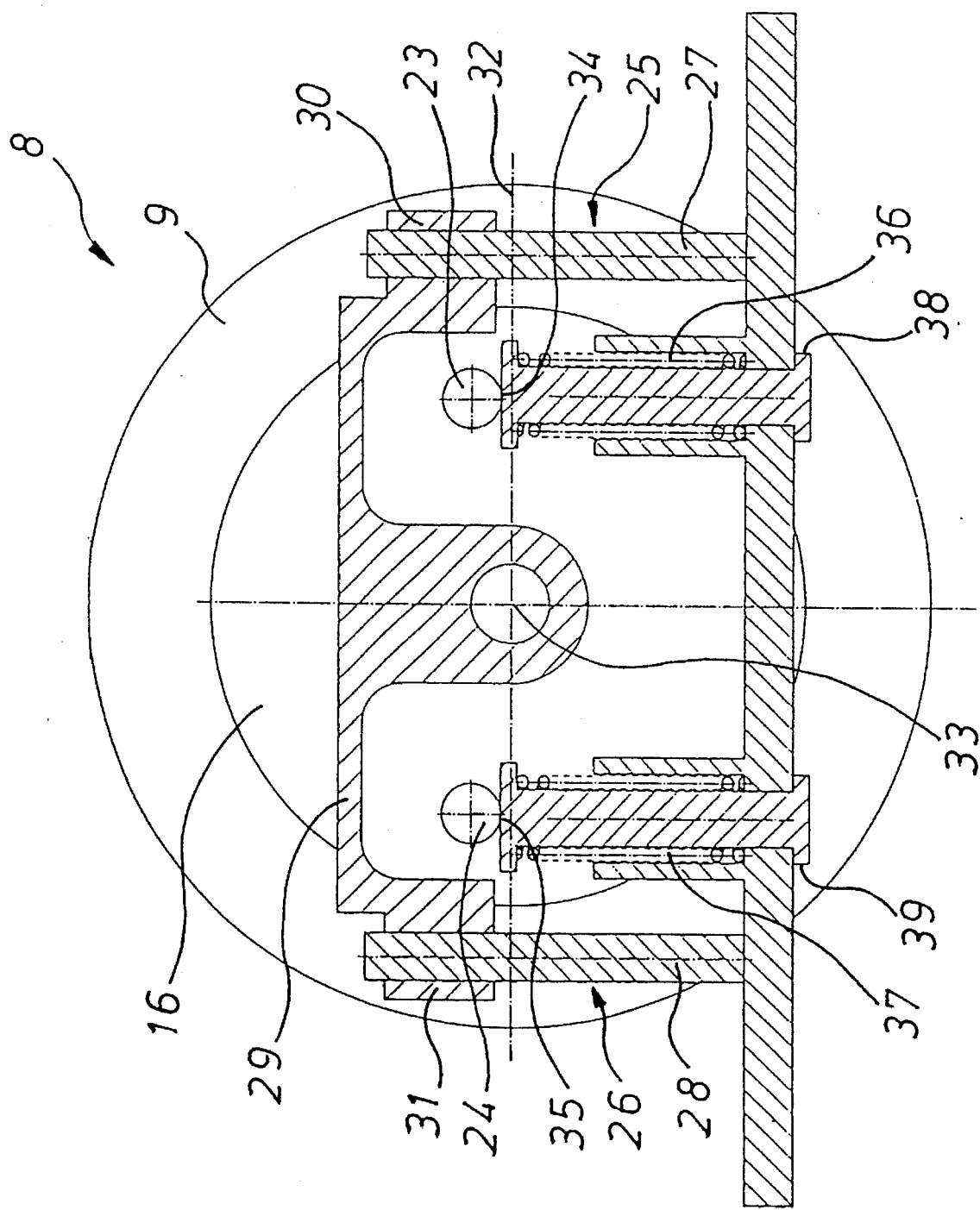
FIG. 3 shows a section through a drive unit in the arc of linear guides and movable stops before the excursion of a planet gear rocker.

In the sectional drawing of FIG. 3, it can be seen that four linear guides 25, 26 (two additional ones are located on the other side of the conveying wheel 9) are arranged in a rectangular arrangement within the housing. One part of the linear guides is made in form of a vertically standing guide bolt 27, 28 attached to the housing. The movable portion of the linear guides 25, 26 consists of a bearing element 29 of the drive element 8 having guide sleeves 30, 31 which are slidingly received over the guide rods 27, 28.

When the planet gear rocker 16 is in a central position, the supporting rods 23, 24 are positioned so that they engage against stops 34, 35 with their lower support surfaces approximately at the level of a horizontal plane 32 passing through the sun gear axis 33. Stops 34, 35 are capable of sliding vertically in a telescopic guide in the same direction as the linear guides 25, 26, and are forced into an upper position determined from below by shoulders 38, 39. As a result the bearing element 29, or the drive element 8, is also brought into an upper position as shown in FIG. 3.

Operation

The operation of the arrangement of FIGS. 2 and 3 will now be explained referring to FIG. 4. In a loading process the drive motor 21 is switched on and the sun gear 22 is rotated. The planet gear rocker 16 is held by the spring-loaded stops 34, 35 in the position of the supporting rods 23, 24 as shown in FIG. 3. The planet gears 12, 13, 14 and the conveying wheel 9 move in an unloaded idle speed in a direction of rotation shown in the drawing.

Figure 4:
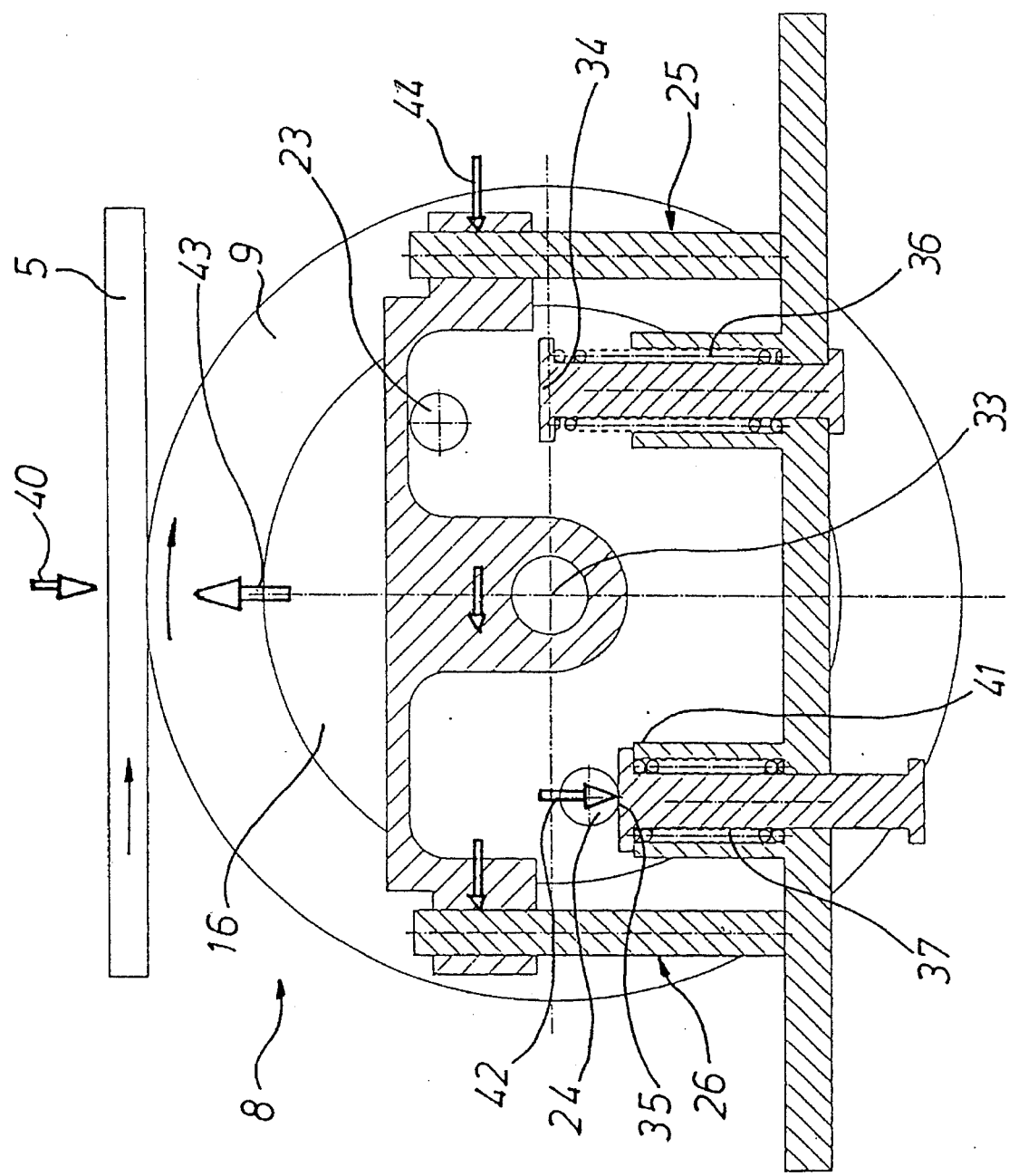
FIG. 4 is a representation according to FIG. 3 after the adaptation of contact pressure as a result of swivelling the planet gear rocker.

FIG. 4 schematically shows the bottom 5 of a load, e.g. a container bottom, with a load weight indicated by a force arrow 40 (the directions of movement are always indicated by line arrows and the force vectors with wide arrows and tip). The load 5 has already run up on the rubber coating 10 of the conveying wheel. The load has moved the entire drive element 8 slightly downward against the force of the springs 36, 37, possibly at the beginning of the running-up process. At the same time the relatively rapidly running idling conveying wheel 9 was braked slightly by the load so that a horizontally acting opposing force arrow 44 is exerted on the one hand by the bearing element 29 upon the linear guides 25, 26. On the other hand, a contrary torque is exerted upon the planet gear rocker 16, whereby the springs 36, 37 are sized so that they are overcome by this contrary torque. As a result the planet gear rocker moves the stop 35 slightly down by supporting bolt 24 into a fixed contact position against a support 41. The planet gear rocker is now supported in this position by supporting bolt 24, whereby a force is acting as indicated by arrow 42. Since this support is offset laterally in relation to the central sun gear axis 33, and since the torque acts upon the planet gear rocker 16 as before, a contrary upward force (arrow 43) is exerted upon the entire drive element 8. This upward force (arrow 43) is equal to the contact pressure on the underside of the load 5. The upward force obviously increases as the rotatory movement of the conveying wheel 9 is subjected more heavily to the weight of the loaded material, since the opposing torque (arrow 43) producing the contact pressure on the planet gear rocker 16 then increases at the same rate. The contact pressure (arrow 43) is proportional to the load on the conveying wheel 9 so that the frictional force between conveying wheel 9 and load 5 is optimally and automatically adjusted to the loads. This leads to reduced wear of the components and prevents overloading of the device by the weight of the loaded material.

When loads are conveyed in the opposite direction by reversing the drive motor 21, the reverse conditions apply in such manner that the supporting bolt 24 lifts off from its stop 35 and the supporting rods 23 supports the opposing moment of the planet gear rocker on the stops 34 which is moved downward, so that the same optimal adjustment of the contact pressure (arrow 43) is achieved.

While a preferred embodiment of the invention has been described using specific terms, such description is for illustrative purposes only, and it is to be understood that changes and variations may be made without departing from the spirit or scope of the following claims.

What is claimed is:

1. A drive unit for loading equipment into an equipment cargo area wherein the drive unit is of the type which includes a drive element including a conveying wheel which is driven by a drive motor through a transmission for conveying an equipment load when engaging said load; a housing in which said drive element is disposed; said transmission containing a planetary gear arrangement which includes a sun gear having teeth meshing with the teeth of at least one planet gear which is connected to the conveying wheel for driving the conveying wheel wherein said planet gear is mounted on a planet gear rocker which carries said planet gear and swivels about an axis of rotation; at least one supporting element carried by said planet gear rocker; a stop associated with said supporting element such that the conveying wheel is forced upward with a force that is proportional to a braking moment produced by a load being placed upon said conveying wheel; wherein said drive unit comprises:

a plurality of linear guides carried by said housing for supporting and guiding said drive element in linear motion;

said linear guides including a fixed guide element carried by said housing;

said linear guides including a moveable guide element carried by said drive element, said moveable guide element sliding relative to said fixed guide element so that said drive element is displaced and movably connected relative to said housing;

said planet gear rocker rotates coaxially with the sun gear;

said supporting element is carried by the planet gear rocker at a lateral distance from the sun gear axis and lies generally on the same horizontal plane, said supporting element rotates with said planet gear rocker so that the movement of the supporting element is along an arc that is substantially close to a vertical movement in the same direction that said planet gear rocker moves with respect to said linear guides; and said stop being carried by said housing in the path of movement of said supporting element in such a manner that when said sun gear is driven and a braking moment is provided to the conveying wheel, said supporting element engages said stop with an opposing force which causes an opposite shifting force to be applied to said moveable guide elements of said linear guides;

whereby said drive element and conveying wheel are forced vertically upward with a force that is proportional to the braking moment applied to the conveying wheel.

2. The drive unit of claim 1 wherein said conveying wheel includes a hollow portion in which said planetary gear including said sun gear, planet gear, and planet gear rocker are disposed; and said conveying wheel includes inner teeth which mesh with the outer teeth of said planet gear.

3. The drive unit of claim 1 wherein three planet gears are carried by said planet gear rocker with an angular spacing of one hundred twenty degrees between rotational axis of said planet gears.

4. The drive unit of claim 1 including a frictional coating carried on the circumference of said conveying wheel.

5. The drive unit of claim 1 which includes four linear guides carried by said housing arranged in a rectangular arrangement.

6. The drive unit of claim 1 wherein said fixed guide elements of said linear guides are affixed to said housing and includes cylindrical guide rods; and said moveable guide elements slide and reciprocate vertically on said guide rods to provide a bearing element.

7. The drive unit of claim 1 wherein said support elements are disposed on each side of the rotational axis of said sun gear at generally equal distances, and a stop is carried by said housing and associated with each said supporting element.

8. The drive unit of claim 1 wherein said supporting element extends generally parallel to a rotational axis of said sun gear.

9. The drive unit of claim 8 including a plurality of said supporting elements disposed on opposing sides of said rotational axis of said sun gear, and said supporting elements lie generally in a horizontal plane extending through said sun gear axis.

10. The drive unit of claim 9 wherein the distance between said supporting elements and said sun gear axis is approximately one-half the radius of the conveying wheel.

11. The drive unit of claim 1 wherein said stop can be shifted in the same direction as said moveable guide elements of said linear guide between an upper and lower position;

said stop being forced into said upper position by a spring associated with said stop causing said drive to be brought into an upper, non-load bearing position through displacement on said linear guides; and said spring being sized so that when a braking moment is applied to said conveying wheel, said braking moment is overcome by an opposing force which is produced through the planet gear rocker so that said load bearing stop is moved into a lower position to support the supporting element.

12. The drive unit of claim 1 wherein a braking device is provided in operative engagement with at least one planet gear for overcoming the braking moment applied to the conveying wheel.

13. A drive unit for loading equipment into an equipment storage area comprising:

a drive element which includes a conveying wheel for conveying an equipment load when engaging said load, and a drive motor and a transmission for driving said conveying wheel;

a housing in which said drive element is disposed;

said transmission containing a planetary gear arrangement which includes a sun gear having teeth meshing with the teeth of at least one planet gear which is connected to the conveying wheel for driving the conveying wheel;

a planet gear rocker which carries said planet gear and rotates about an axis of rotation coaxial with said sun gear;

a plurality of linear guides carried by said housing for supporting and guiding said drive element in linear motion;

said linear guides including a fixed guide element carried by said housing; and moveable guide sleeves slidably carried by said drive element, said moveable guide sleeves sliding relative to said fixed guide element so that said drive element is displaced relative to said housing;

a plurality of supporting elements carried by said planet gear rocker;

a stop associated with each said supporting element such that the conveying wheel is forced upward with a force that is proportional to a braking moment produced by a load being placed upon said conveying wheel;

said supporting elements being carried by said planet gear rocker at a lateral distance from the sun gear axis and lies generally on the same horizontal plane;

said supporting elements rotate with said planet gear rocker so that the movement of the supporting elements along an arc; and said stops being carried by said housing in the path of movement of said supporting elements in such a manner that when said sun gear is driven and a braking moment is provided to the conveying wheel, said supporting elements may engage said stops so that said drive element and conveying wheel are forced vertically upward with a force that is proportional to the braking moment applied to the conveying wheel.

14. The drive unit of claim 13 wherein three planet gears are carried by said planet-gear rocker with an angular spacing of one hundred twenty degrees between rotational axis of said planet gears.

15. The drive unit of claim 13 including a frictional coating carried on the circumference of said conveying wheel.

16. The drive unit of claim 13 including a bearing element in which said sun gear axis is journaled, said bearing element being carried by said fixed guide elements of said linear guides.

17. The drive unit of claim 13 including a plurality of said support elements disposed on opposing sides of said rotational axis of said sun gear, and said support elements lie generally in a horizontal plane extending through said sun gear axis.

18. The drive unit of claim 17 wherein the distance between said supporting elements and said sun gear axis is approximately one-half the radius of the conveying wheel.

19. The drive unit of claim 13 wherein said stops can be moved in the same direction as said moveable guide sleeves of said linear guide between an upper and lower position;

said stops being forced into said upper position by a spring associated with said stop causing said drive to be brought into an upper, non-load bearing position through displacement on said linear guides; and said springs being sized so that when a braking moment is applied to said conveying wheel, said braking moment is overcome by an opposing force which is produced through the planet gear rocker so that said load bearing stop is moved into a lower position to support the supporting element.

20. The drive unit of claim 13 which includes four linear guides carried by said housing arranged in a rectangular arrangement.

* * * * *